UNITED STATES PATENT OFFICE.

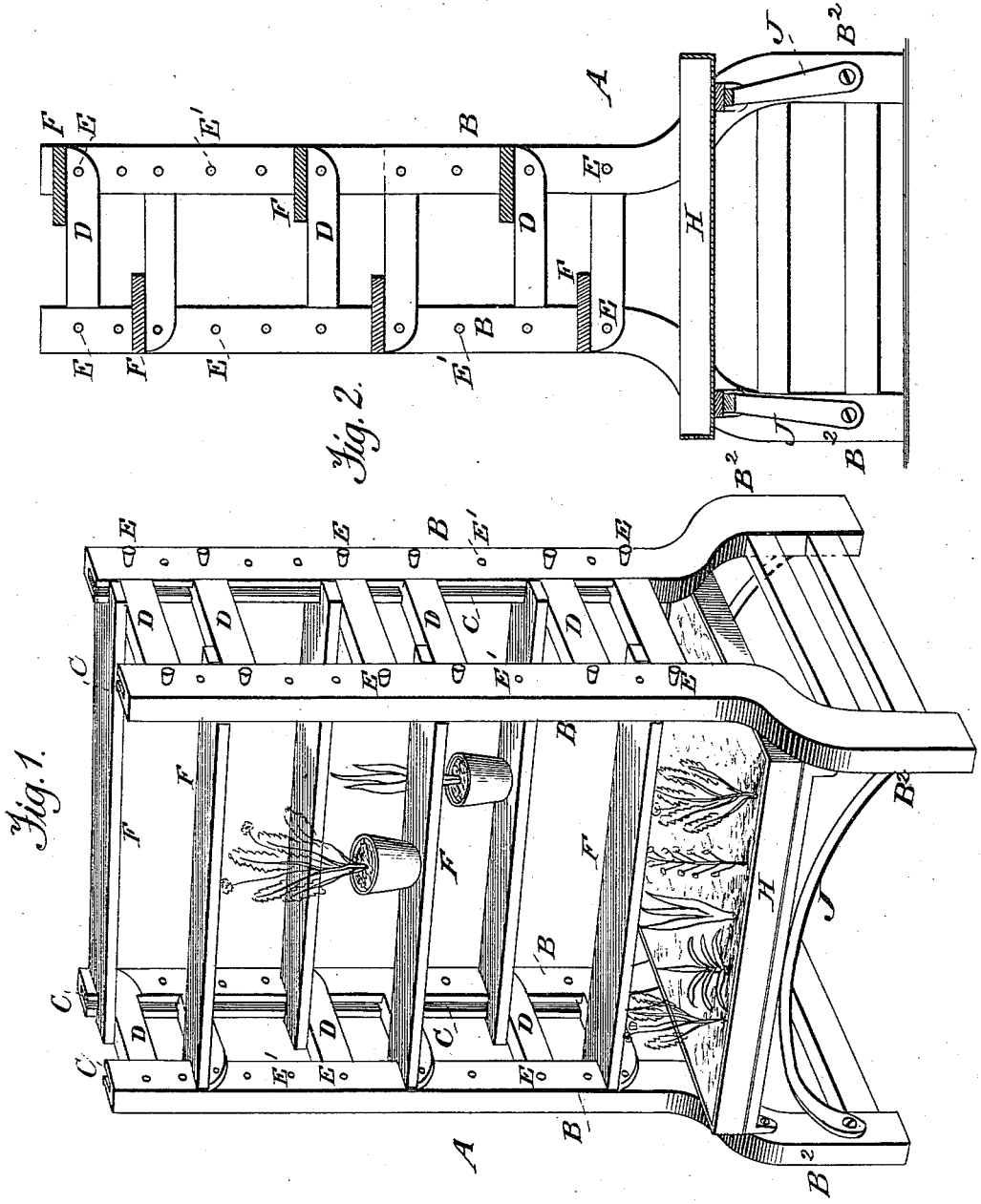

WILLIAM H. WRIGHT, OF HUNTINGDON, PENNSYLVANIA.

FLOWER-STAND.

SPECIFICATION forming part of Letters Patent No. 379,261, dated March 13, 1888.

Application filed October 29, 1887. Serial No. 253,771. (No model.)

*To all whom it may concern:*

Be it known that I, WILLIAM H. WRIGHT, a citizen of the United States, residing at Huntingdon, in the county of Huntingdon and State of Pennsylvania, have invented certain new and useful Improvements in Flower-Stands; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to flower-stands, and has for its object to provide a stand of this kind which will be simple and inexpensive in its construction, and which, while occupying but little space, will, by a suitable arrangement of adjustable shelves, afford shelf-room for a large number of plants.

A further object of the invention is to provide, in connection with the stand, a shallow tray so arranged as to retain the water which may drip from the plant-jars, and is also suited for use in the propagation of plants.

To these ends and to such others as the invention may relate the same consists in the peculiar combination, and in the novel construction, arrangement, and adaptation of parts, all as more fully hereinafter described, shown in the drawings, and then specifically defined and claimed.

In the accompanying drawings, Figure 1 is a perspective view of a flower-stand constructed in accordance with my invention. Fig. 2 is a plan view of the same.

Reference being had to the drawings, A represents the stand, provided at each of its corners with uprights B, each of these uprights being curved outward at a point near its lower end to form the legs or supports $B^2$. The vertical portion of each of the uprights is provided upon its inner face with a longitudinal groove, C, to receive the ends of the shelf-supports D, which are formed at their ends with tenons adapted to fit loosely within the groove, and are made adjustable therein by means of removable pins E, passed through the holes E' in the uprights.

F F are narrow shelves, cut away at their ends, as shown, so as to adapt them to closely embrace the uprights. The shelves are preferably arranged so that each alternate shelf shall be placed at the front of the frame and the next succeeding shelf at the rear, thus affording space for twice the number of plants that could be accommodated were the shelves arranged one above another.

The lower portion of the stand is provided with a tray or shallow pan, H, resting upon suitable supports, J, secured at their ends to the legs of the stand. It will be readily seen that the position of the tray is such that it will retain any waste water that may fall from the plants while watering them, and also serves for use in propagating young plants. When not desired for use the parts may be readily detached and stowed within small compass.

Having thus described my invention and set forth its merits, what I claim to be new, and desire to secure by Letters Patent, is—

The flower-stand described, consisting of the slotted uprights B, curved outwardly at their lower ends to form a base for the stand, the drip-pan H, resting upon suitable supports secured near the lower ends of the uprights, the shelf-supports D, adjustable within the slots in the uprights, and the shelves F, resting upon said supports and arranged alternately at the front and rear of the stand, substantially as and for the purpose specified.

In testimony whereof I affix my signature in presence of two witnesses.

WILLIAM H. WRIGHT.

Witnesses:
R. K. FOSTER,
JNO. S. BARE.